US012270351B2

(12) United States Patent
Mossberg et al.

(10) Patent No.: US 12,270,351 B2
(45) Date of Patent: Apr. 8, 2025

(54) REVERSING METHOD FOR A VEHICLE POWERTRAIN

(71) Applicant: Schaeffler Technologies AG & Co. KG, Herzogenaurach (DE)

(72) Inventors: Jeffrey Mossberg, Troy, MI (US); Andrew Mlinaric, Lakeshore (CA)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/408,640

(22) Filed: Jan. 10, 2024

(65) Prior Publication Data

US 2024/0271579 A1 Aug. 15, 2024

Related U.S. Application Data

(60) Provisional application No. 63/445,315, filed on Feb. 14, 2023.

(51) Int. Cl.

*F01L 13/02* (2006.01)
*F01L 1/34* (2006.01)
*F01L 1/344* (2006.01)
*F02D 13/02* (2006.01)
*F02D 27/00* (2006.01)
*F02N 11/08* (2006.01)

(52) U.S. Cl.

CPC ................ *F02D 27/00* (2013.01); *F01L 1/34* (2013.01); *F01L 1/344* (2013.01); *F02D 13/0215* (2013.01); *F02N 11/0859* (2013.01)

(58) Field of Classification Search

CPC ........... F02D 41/0087; F02D 2041/001; F02D 13/0207; Y02T 10/62; B60W 10/08; B60W 20/00; F02N 19/005; B60K 6/485

USPC ........................................................ 123/41 E

See application file for complete search history.

(56) References Cited

U.S. PATENT DOCUMENTS

| | | | | |
|---|---|---|---|---|
| 6,318,068 | B1 | 11/2001 | Shaw | |
| 6,453,863 | B1 | 9/2002 | Pels et al. | |
| 9,505,450 | B1 | 11/2016 | Girouard et al. | |
| 11,391,227 | B1 * | 7/2022 | Kiwan | F02D 41/0087 |
| 11,415,207 | B2 * | 8/2022 | Pard | F16H 3/089 |
| 2002/0112902 | A1 * | 8/2002 | Wakashiro | F02D 13/06 903/905 |
| 2002/0183154 | A1 | 12/2002 | Ziemer | |
| 2012/0226431 | A1 | 9/2012 | Mitsuhashi | |
| 2014/0128215 | A1 * | 5/2014 | Schoenek | B60K 6/448 903/902 |
| 2016/0169184 | A1 * | 6/2016 | Winkler | F16H 7/0827 290/31 |
| 2017/0082082 | A1 | 3/2017 | Liu et al. | |

(Continued)

FOREIGN PATENT DOCUMENTS

| | | |
|---|---|---|
| WO | 2007095819 A1 | 8/2007 |
| WO | 2022162638 A1 | 8/2022 |

*Primary Examiner* — Long T Tran
*Assistant Examiner* — James J Kim
(74) *Attorney, Agent, or Firm* — Matthew V. Evans

(57) ABSTRACT

A method for moving a vehicle in a reverse direction is provided. The method includes: providing an internal combustion engine, a transmission, and an electric machine; adjusting a valve timing of either an intake valve or an exhaust valve during a non-firing mode of the internal combustion engine to reduce a rotational resistance; and, rotating the internal combustion in a backwards or reverse direction so that the vehicle moves in a reverse direction.

19 Claims, 4 Drawing Sheets

(56) References Cited

U.S. PATENT DOCUMENTS

| | | | | |
|---|---|---|---|---|
| 2020/0123965 | A1* | 4/2020 | Bastanipour | F02B 37/12 |
| 2021/0009235 | A1* | 1/2021 | Okada | B62J 50/225 |
| 2021/0179070 | A1* | 6/2021 | Ademane | B60W 50/0097 |
| 2021/0293214 | A1* | 9/2021 | Umashankar | F02N 11/04 |
| 2022/0307571 | A1* | 9/2022 | Iguma | F16F 15/262 |
| 2023/0102266 | A1* | 3/2023 | Crain | F02P 9/002<br>701/113 |

* cited by examiner

REVERSING METHOD FOR A VEHICLE POWERTRAIN

CROSS-REFERENCE TO RELATED APPLICATIONS

This application claims priority to U.S. Provisional Application No. 63/445,315 filed Feb. 14, 2023, the entire disclosure of which is incorporated by reference herein.

TECHNICAL FIELD

This disclosure is generally related to a method of operating a vehicle powertrain and an internal combustion (IC) engine thereof.

BACKGROUND

For some powertrains, rotating an IC engine in a reversed rotational direction is desirable for moving a vehicle in a reverse direction. However, firing a four-stroke internal combustion engine in a reverse direction is typically not suitable for operation without complex valvetrain variability.

SUMMARY

A method of operating an internal combustion (IC) engine to move a vehicle in a reverse direction is provided. The IC engine includes a combustion chamber defined by an intake valve, an exhaust valve, and a piston. The method includes:

a). rotating the IC engine in a first rotational direction via combustion events that occur within the combustion chamber via: i) a first intake valve timing of the intake valve relative to a firing engine combustion cycle, and ii) a first exhaust valve timing of the exhaust valve relative to the firing engine combustion cycle;

b). commencing shutdown of the IC engine;

c). adjusting at least one of:

an intake valve timing from the first intake valve timing to a second intake valve timing relative to the firing engine combustion cycle in order to decrease a rotational resistance of the IC engine; or an exhaust valve timing from the first exhaust valve timing to a second exhaust valve timing relative to the firing engine combustion cycle in order to decrease a rotational resistance of the internal combustion engine; and d). rotating the IC engine in a second rotational direction via an electric machine.

In an example embodiment, the firing engine combustion cycle is a four-stroke combustion cycle.

In an example embodiment, the second intake valve timing is retarded relative to: i) the first intake valve timing, and ii) the firing engine combustion cycle.

In an example embodiment, the second exhaust valve timing is advanced relative to: i) the first exhaust valve timing, and ii) the firing engine combustion cycle.

In an example embodiment, the IC engine includes an electric camshaft phaser configured for adjusting at least one of the intake valve timing or the exhaust valve timing.

In an example embodiment, the IC engine does not include a variable valve train configured to vary a valve lift of the intake valve and a valve lift of the exhaust valve.

In an example embodiment, the IC engine includes at least one camshaft configured to actuate at least one of the intake valve or the exhaust valve. In a further aspect, the at least one camshaft includes a cam lobe having a first flank, a cam nose, and a second flank arranged consecutively around a circumference of the cam lobe. When the IC engine is rotating in the first rotational direction via combustion events, the first flank opens one of the intake valve or the exhaust valve, and the second flank closes the one of the intake valve or the exhaust valve; and when the IC engine is rotating in the second rotational direction via the electric machine, the second flank opens the one of the intake valve or the exhaust valve, and the first flank closes the one of the intake valve or the exhaust valve.

A method for moving a vehicle in a reverse direction is provided. The method includes:

a). providing a vehicle with a powertrain comprising:

an IC engine having a piston configured to reciprocate within an engine cylinder, defining a combustion cycle within a combustion chamber formed by the piston and the engine cylinder; and the IC engine is configured to rotate in a first rotational direction via combustion events within the combustion chamber; and a transmission configured to be driven by the IC engine and deliver at least one of an adjusted speed or an adjusted torque of the IC engine to a propulsion interface element of the vehicle; and when the IC engine rotates in the first rotational direction, the vehicle moves in a forward direction; and b). decompressing the IC engine such that the combustion chamber is continuously vented throughout a duration of each upward stroke of the piston within the engine cylinder from a bottom dead center position to a top dead center position; and c). rotating the IC engine in a second rotational direction via an electric machine so that the vehicle moves in a reverse direction.

In an example embodiment, the combustion chamber is continuously vented via a valve configured to fluidly connect the combustion chamber to a passageway configured to flow air out of the combustion chamber. In a further aspect, a timing of an opening of the valve relative to the combustion cycle is variable and the opening of the valve is electronically controlled.

In an example embodiment, the transmission is not configured to move the vehicle in the reverse direction when the IC engine is rotating in the first rotational direction.

In an example embodiment, the engine cylinder further comprises an intake valve and an exhaust valve configured to respectively allow air into the engine cylinder and discharge combustion gases out of the engine cylinder. In a further aspect, the intake valve and the exhaust valve are configured to continuously vent the combustion chamber throughout the duration of each upward stroke of the piston within the engine cylinder.

A method for moving a vehicle in a reverse direction is provided. The method includes:

a). providing a vehicle with a powertrain that includes:

an IC engine operating according to a four-stroke combustion cycle defined by a reciprocating piston within an engine cylinder, and an intake valve and an exhaust valve configured to respectively control a flow of gases in and out of a combustion chamber formed by the reciprocating piston and the engine cylinder; and the IC engine is configured to rotate in a first rotational direction via combustion events within the combustion chamber; and a transmission configured to be driven by the internal combustion engine and deliver at least one of an adjusted speed or an adjusted torque of the internal combustion engine to a propulsion interface element of the vehicle; and b). adjusting at least one of an intake valve timing or an exhaust valve timing via an electric camshaft phaser when the IC engine is in a non-firing mode in order to reduce a rotational resistance of the internal combustion engine; and c). rotating the IC engine in a second rotational direction via an electric machine so that the vehicle moves in a reverse direction.

In an example embodiment, the electric machine is a belt-alternator-starter arranged within an accessory drive of the IC engine.

In an example embodiment, the electric machine is an integrated starter generator arranged on a crankshaft of the IC engine.

In an example embodiment, the electric machine is a transmission motor generator arranged on or within the transmission.

In an example embodiment, the intake valve and the exhaust valve are actuated via a cam lobe and the intake valve lift and the exhaust valve lift are not variable.

BRIEF DESCRIPTION OF THE DRAWINGS

The foregoing Summary will be best understood when read in conjunction with the appended drawings. In the drawings.

DETAILED DESCRIPTION

The foregoing discussion describes embodiments of devices and embodiments of methods that can be utilized to move a vehicle in a backwards or reverse direction without the use of a reversing mechanism (such as a reversing gear assembly) within a transmission of the vehicle. The powertrains described herein facilitate such a reverse movement of the vehicle by rotating an internal combustion (IC) engine in a direction opposite to that of its normal "firing engine" rotational direction. This reverse rotation of the engine is carried out by an electric machine. For the sake of this disclosure, the term "electric machine" is a general term for devices that convert mechanical energy to electrical energy (or vice versa) using electromagnetic forces. Examples of electric machines include, but are not limited to, electric motors and electric generators. The electric machine can be that of an integrated starter generator (ISG), a belt-starter-alternator system (BAS) located within an auxiliary or accessory drive of an IC engine, a transmission motor generator (TMG) located in or on a transmission of a vehicle, or any other suitable electric machine that is present in a vehicle which is capable of rotating the IC engine. The electric machines described herein are bi-rotational (capable of rotating in both rotational directions), as known in the art of electric motors. This capability allows them to rotate: i) in a first direction in order to carry out their typical task of providing power to the powertrain, and ii) in a second direction to spin the IC engine backwards. In an example embodiment, rotation of the IC engine by the electric machine occurs when the engine is in a non-firing mode. When a non-firing engine is rotated via an electric motor, the term "motored" is often used. Therefore, the described methodology involves motoring the engine in a reverse rotation.

In order to reduce the work required by the electric motor during this reverse rotation, the IC engines described herein can be decompressed via a phasing of an intake valve event or an exhaust valve event relative to an engine combustion cycle. The depressurization of the IC engines described herein reduces a rotational resistance of the IC engine so as to minimize a power (and corresponding size) requirement of the electric machine. In an example embodiment, an electric camshaft phaser is utilized to carry out the phasing of the intake and exhaust valve lift events.

Figure 1:
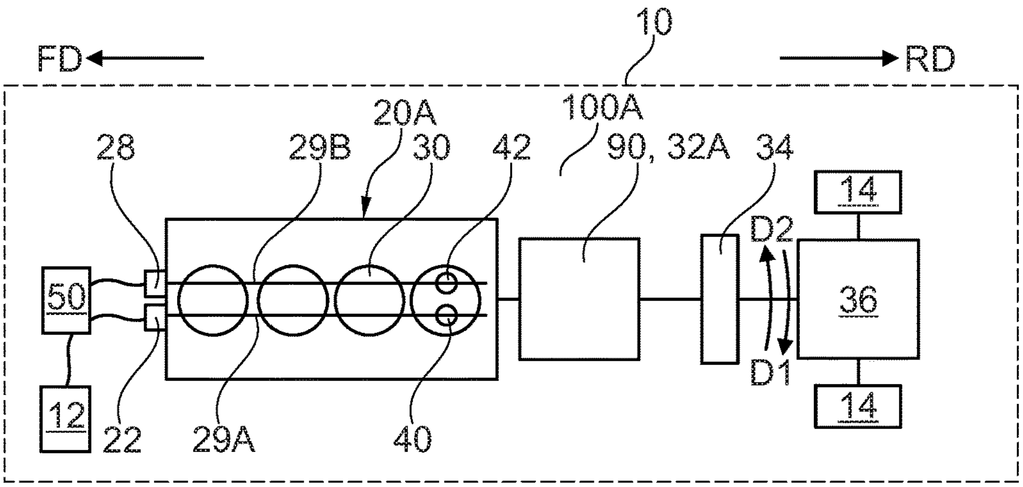
FIG. 1 shows a schematic diagram of a vehicle with a powertrain that includes an internal combustion (IC) engine, an integrated starter generator (ISG), a clutch, and a transmission.
Figure 2:
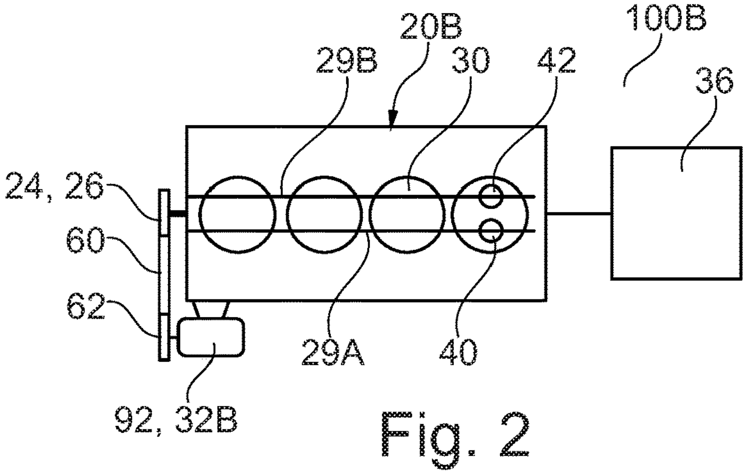
FIG. 2 shows a schematic diagram of a powertrain that includes an IC engine, a belt-alternator-starter (BAS), and a transmission.
Figure 3:
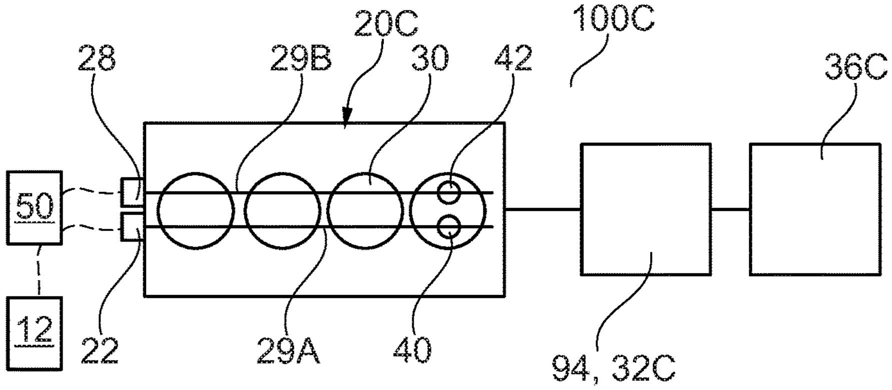
FIG. 3 shows a schematic diagram of a powertrain that includes an IC engine and a transmission that includes a transmission motor generator (TMG).
Figure 4:
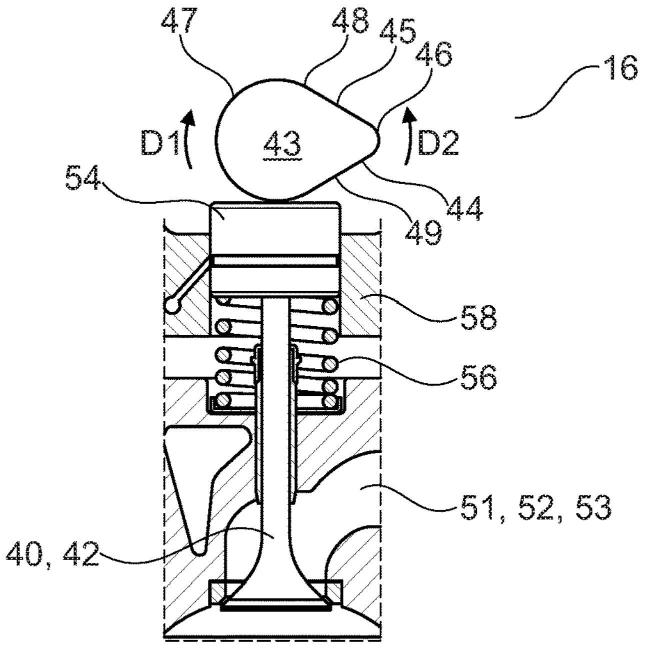
FIG. 4 shows a cross-sectional view of a cylinder head that reveals an example embodiment of a valve train of an IC engine.
Figure 5:
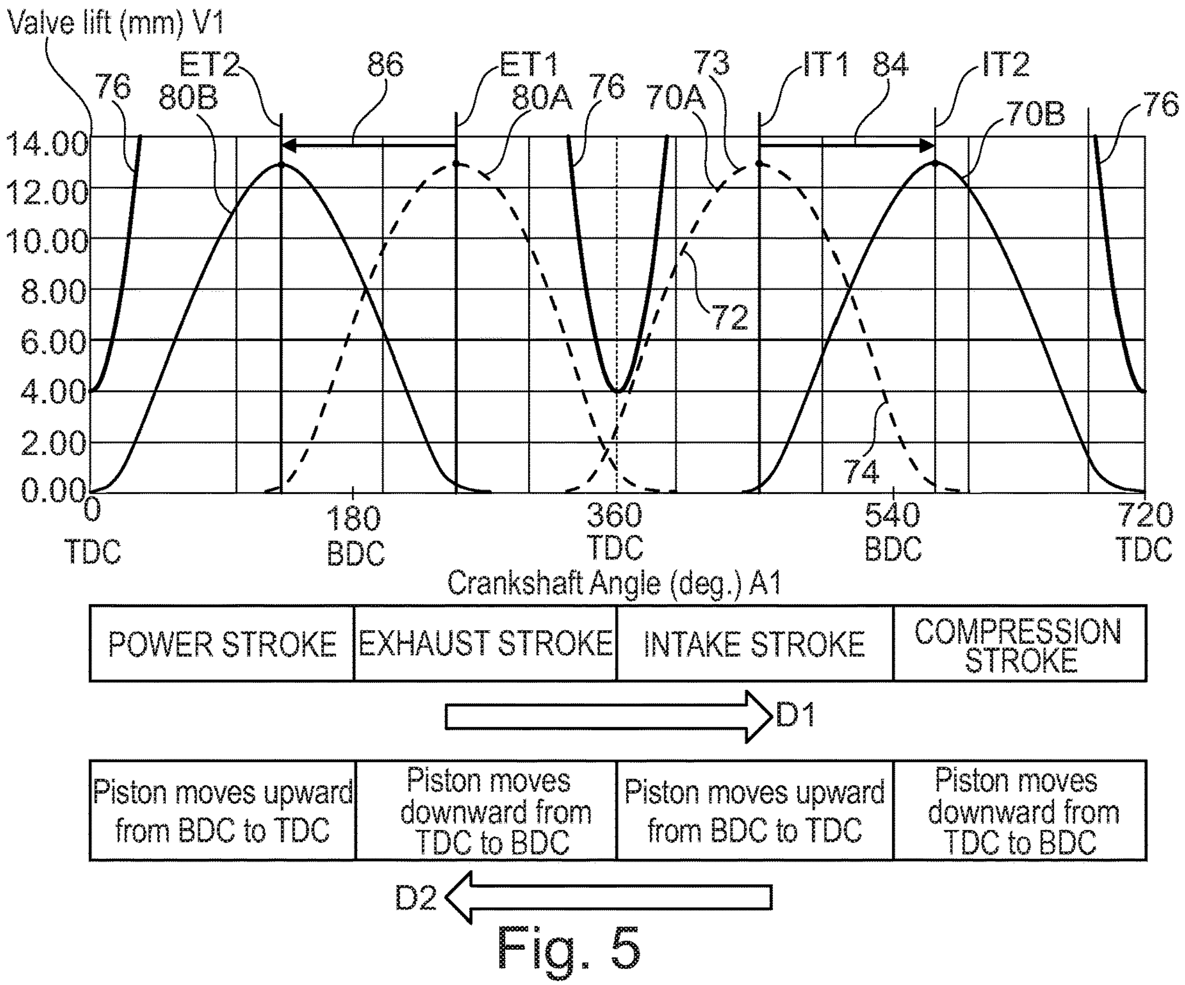
FIG. 5 shows an intake valve lift event and exhaust valve lift event plot for the IC engines of FIGS. 1 through 3.
Figure 6:
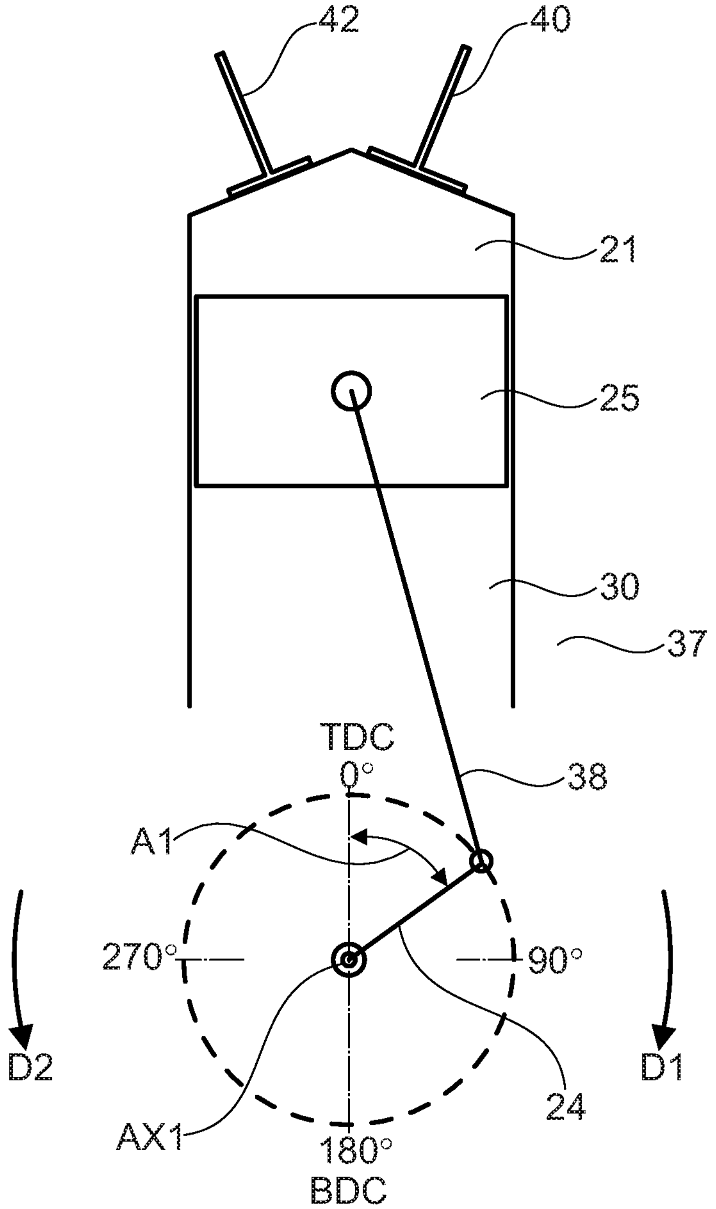
FIG. 6 shows a front view of an engine cylinder and a schematic representation of an associated cranktrain.
Figure 7:
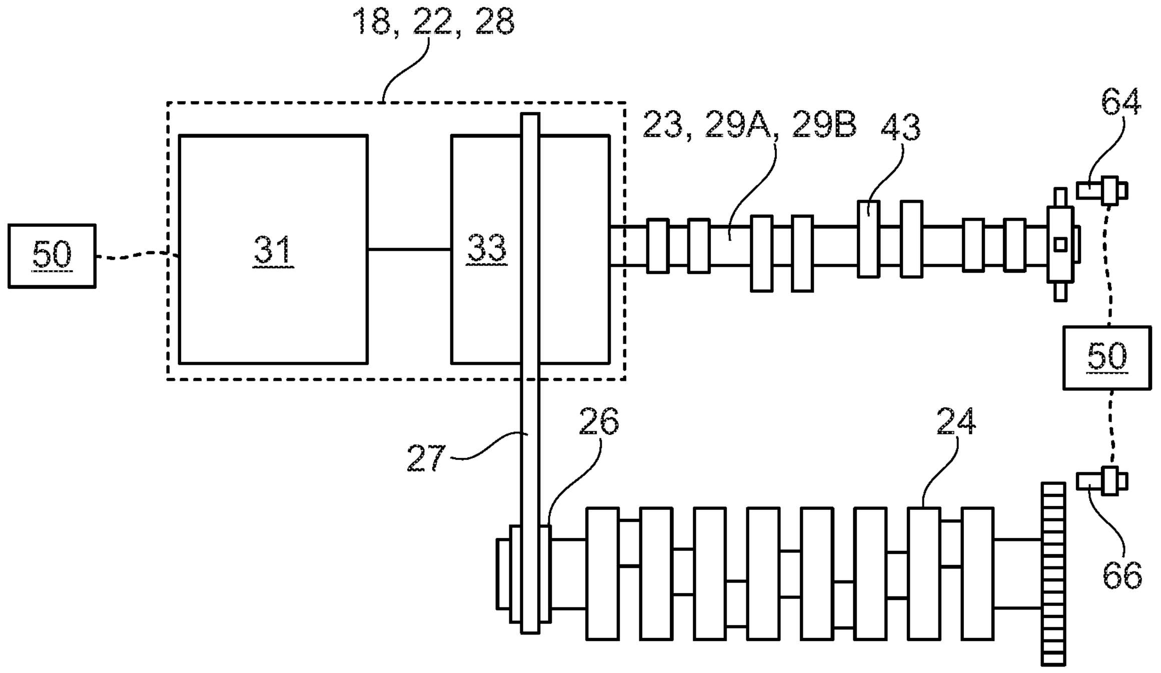
FIG. 7 shows a schematic diagram of an example embodiment of an electric camshaft phaser together with a camshaft and crankshaft.

FIG. 1 shows a schematic diagram of an example embodiment of a vehicle 10 with a powertrain 100A that includes an internal combustion (IC) engine 20A, an ISG 90, a clutch 34, a transmission 36, and propulsion interface elements 14. FIG. 2 shows a schematic diagram of an example embodiment of a powertrain 100B that includes an IC engine 20B, a BAS 92, and the transmission 36. FIG. 3 shows a schematic diagram of an example embodiment of a powertrain 100C that includes an IC engine 20C and a transmission 36C that includes a TMG 94. FIG. 4 shows a cross-sectional view of a cylinder head 58 that reveals an example embodiment of a valve train 16 that can be used for the IC engines 20A, 20B, 20C. FIG. 5 shows a plot of example embodiments of intake valve lift events 70A, 70B and exhaust valve lift events 80A, 80B for IC engines 20A, 20B, 20C. FIG. 6 shows a front view of an example embodiment of an engine cylinder 30 together with a schematic representation of a cranktrain 37. FIG. 7 shows a schematic diagram of an example embodiment of an electric camshaft phaser 18 together with a camshaft 23 and crankshaft 24. The following discussion should be read in light of FIGS. 1 through 7.

Turning to FIGS. 1 and 6, the IC engine 20A can utilize a known four-stroke combustion cycle. The IC engine 20A includes pistons 6 that slidably reciprocate within engine cylinders 30. In an example embodiment, the IC engine 20A has one engine cylinder 30; in a further example embodiment, the IC engine 20A has two engine cylinders 30. However, any suitable number of engine cylinders 30 is possible to achieve a desired torque or power output of the IC engine 20A. Each engine cylinder 30 includes at least one intake valve 40 actuated by an intake camshaft 29A, and at least one exhaust valve 42 actuated by an exhaust camshaft 29B. The intake and exhaust valves 40, 42 can be typical poppet valves, which have widespread use within global IC engines, or any other suitable valve type. The intake camshaft 29A is operatively connected to an electric intake camshaft phaser (EICP) 22 and the exhaust camshaft 29B is operatively connected to an electric exhaust camshaft phaser (EECP) 28.

Turning to FIG. 7, the EICP 22 and the EECP 28 can include an electric motor 31 that is operatively connected to respective intake and exhaust camshafts 29A, 29B via a gearbox 33. The gearbox 33 can be replaced with any other suitable device that transmits an adjusted speed and torque of the electric motor 31 to the intake and exhaust camshafts 29A, 29B. The electric motor 31 can provide input motion to the gearbox 33; and an output motion of the gearbox 33 can be directly transmitted to the camshaft 23. The gearbox 33 can be that of any suitable gearbox, including, but not limited to a strain wave gear device. As known in the field of electric camshaft phasers, the EICP 22 and the EECP 28 can phase the respective intake and exhaust camshafts 29A, 29B when the IC engine 20A is stopped or not rotating. The EICP 22 and the EECP 28 do not require pressurized fluid to phase or actuate the respective intake and exhaust camshafts 29A, 29B relative to the crankshaft 24. Instead, the EICP 22 and the EECP 28 utilize electrical energy to provide the input motion to the gearbox 33. A housing of the gearbox 33 can be rotationally driven by a crankshaft pulley 26 via an endless drive band 27 such as a belt or chain.

The ISG 90, also known amongst hybrid powertrains as a "P1" configuration, is connected directly to a crankshaft 24 and can replace a conventional starter, an alternator, and a flywheel of an IC engine. The ISG 90 can start the IC engine 20A and supply power to the powertrain 100A in certain operating conditions. The ISG 90 could also be described as a first electric machine 32A configured to independently rotate the crankshaft 24 of the IC engine 20A; that is, the first electric machine 32A by itself can rotate the crankshaft 24.

The transmission 36 can be of any suitable type, including, but not limited to, a continuously variable transmission (CVT) or a geared transmission. A clutch 34 can be arranged between the ISG 90 and the transmission 36 so that rotational energy provided by the ISG 90 can be selectively delivered to the transmission 36.

The transmission 36 can be drivably connected to at least one propulsion interface element 14 such as a wheel, track, propeller, or any other means to move the vehicle in a forward direction FD or a reverse direction RD. The term "propulsion interface element" signifies a propulsion component that interfaces with a multi-terrain medium (trail, road, air, water) to move a vehicle. The propulsion interface element 14 could also be described as a "rotary propulsion interface element" due to its rotary nature. The transmission 36 delivers an adjusted speed and/or an adjusted torque of the IC engine 20A to the propulsion interface element 14 to move the vehicle 10 through the applicable multi-terrain medium.

Turning to FIG. 6, the engine cylinder 30 slidingly receives a piston 25 that is connected to the crankshaft 24 via a connecting rod 38. The piston 25 and engine cylinder 30 define a combustion chamber 21. The intake valve 40 and the exhaust valve 42 fluidly connect a passageway 51 to the combustion chamber 21 and respectively facilitate flow of an intake charge into the engine cylinder 30 (via an intake passageway 52) and a discharge of combustion or exhaust gases out of the engine cylinder 30 (via an exhaust discharge passageway 53). Stated otherwise, the intake and exhaust valve 40, 42 control a flow of gases in and out of the combustion chamber 21. The schematic bottom portion of FIG. 6 illustrates what is meant by the term "crankshaft angle" and the corresponding crank angles for a top-dead-center (TDC) position and a bottom-dead-center (BDC) position of the piston 25 within the engine cylinder 30.

As shown in FIG. 6, rotation of the crankshaft 24 in a first direction D1 (clockwise) corresponds to a normal rotation of an IC engine when the engine is viewed from the front (per SAE standard). That is, when the IC engine 20A is operating under the motive force created by a pressure rise in the engine cylinder due to internal combustion, the crankshaft 24 rotates clockwise when viewed from the front. A rotation of the crankshaft 24 in a second direction D2 (counterclockwise) represents a reverse or backward rotation of the crankshaft 24. In a typical vehicle that can move in both forward and reverse directions, clockwise rotation of the IC engine 20A can facilitate both forward and reverse motion of the vehicle via a transmission of a vehicle. Reverse motion of the vehicle is typically accomplished via a reverse device or mechanism within the transmission. This disclosure accomplishes reverse motion of the vehicle by backwards rotation of the IC engine and the corresponding transmission.

The intake valve 40 and the exhaust valve 42 can be actuated by the valve train 16 shown in FIG. 4 which includes a tappet 54, a valve spring 56, and a cam lobe 43. The intake and exhaust valves 40, 42 fluidly connect a passageway 51 to the combustion chamber 21. Other suitable valve train types can also be utilized, including, but not limited to valve trains with rocker arms. The cam lobe 43 can be arranged on the intake camshaft 29A and/or the exhaust camshaft 29B. As known in typical four-stroke IC engines, the intake and exhaust camshafts 29A, 29B rotate at one-half of the rotational speed of the crankshaft 24. When the IC engine 20A is actuated via combustion events within the combustion chamber 21, the cam lobe 43 rotates in the first direction D1, which corresponds to rotation of the crankshaft 24 in the first direction D1. The cam lobe 43 includes a base circle 47, a first opening flank 44, a cam nose 46 or peak lift portion, and a second closing flank 45. Rotation of the cam lobe 43 in the first direction D1 causes the first opening flank 44 to slidingly engage with the tappet 54, which induces a linear opening motion of the tappet 54 and associated intake or exhaust valve 40, 42. Further rotation of the cam lobe 43 in the first direction D1 causes the cam nose 46 to slidingly engage with the tappet 54, which typically corresponds to a maximum linear displacement of the associated intake or exhaust valve 40, 42 (i.e. maximum valve lift). After achieving maximum valve lift via the cam nose 46, the second closing flank 45 slidingly engages the tappet 54, which together with the valve spring 56, induces a closing motion of the associated intake or exhaust valve 40, 42. With respect to the first rotational direction D1, the base circle 47 of the cam lobe 43 connects a closing end 48 of the first closing flank 45 to an opening end 49 of the second opening flank 44. Therefore, the first opening flank 44 is separated from the second closing flank 45 by the base circle 47 and the cam nose 46. When the cam lobe 43 rotates in the first direction D1 engagement of the tappet 54 by the first opening flank 44, the cam nose 46, and the second closing flank 45 occurs consecutively or one after another. When the cam lobe 43 rotates in the second direction D2 due to rotation of the crankshaft 24 in the second direction D2 (backwards rotation of the IC engine 20A), engagement of the tappet 54 by the second closing flank 45, the cam nose 46, and the first opening flank 44 occurs consecutively; therefore the second closing flank 45 opens the associated intake or exhaust valve 40, 42 and the first opening flank closes the associated intake or exhaust valve 40, 42 when the cam lobe 43 is rotated in the second direction D2.

Turning to FIG. 5, a plot of crankshaft angle A1 versus valve lift V1 shows example embodiments of intake valve lift events and exhaust valve lift events for the IC engine 20A. The right grouping represents two phased apart intake valve lift events 70A, 70B, and the left grouping represents two phased apart exhaust valve lift events 80A, 80B. Below the plot are names of associated strokes of a four-stroke combustion cycle when the IC engine 20A is rotating in the first direction D1 (normal "firing engine" direction) and the piston 25 is reciprocating within the engine cylinder 30 between TDC and BDC positions. The associated stroke names (intake, compression, power, exhaust), known in the field of IC engines, are placed within rectangles that depict a duration and location of the respective stroke relative to a corresponding crankshaft angle A1 of the IC engine 20A. The length of each of the four strokes is defined by 180 degrees of angular displacement of the crankshaft 24. Further below the stroke names of the four-stroke combustion cycle is a series of descriptive phrases (piston moves upward/downward) for what occurs when the IC engine 20A is motored in the second direction D2 by the ISG 90. No combustion is occurring when the IC engine 20A is motored, therefore the piston 25 merely reciprocates up and down within the engine cylinder 30 between BDC and TDC positions with a stroke length defined by 180 degrees of angular displacement of the crankshaft 24.

A first intake valve lift event 70A illustrates an example embodiment of a first intake valve timing IT1 relative to a four-stroke combustion cycle that can be utilized for the IC engine 20A. The first intake valve lift event 70A includes: i) an opening flank lift portion 72 that is a result of the first opening flank 44 of the cam lobe 43 slidingly engaging the tappet 54, ii) a cam nose lift portion 73 that is a result of the cam nose 46 slidingly engaging the tappet 54, and iii) a closing flank lift portion 74 that is a result of the second closing flank 45 of the cam lobe slidingly engaging the tappet 54.

The EICP 22 can selectively phase the intake camshaft 29A relative to the crankshaft 24 to achieve a second intake valve lift event 70B that occurs at a second intake valve timing IT2. The second intake valve lift event 70B occurs later within the four-stroke combustion cycle than the first intake valve lift event 70A by an intake phasing magnitude 84; therefore, it could be stated that the second intake valve timing IT2 is retarded relative to the first intake valve timing IT1 when the IC engine 20A is rotating in the first direction D1 due to combustion events (firing engine).

A first exhaust valve lift event 80A illustrates an example embodiment of a first exhaust valve timing ET1 relative to a four-stroke combustion cycle that can be utilized for the IC engine 20A. The EECP 28 can selectively phase the exhaust camshaft 29B relative to the crankshaft 24 to achieve a second exhaust valve lift event 80B that occurs at a second exhaust valve timing ET2. The second exhaust valve lift event 80B occurs sooner within the four-stroke combustion cycle than the first exhaust lift event 80A by an exhaust phasing magnitude 86; therefore, it could be stated that the second exhaust valve timing ET2 is advanced relative to the first exhaust valve timing ET1 when the IC engine 20A is rotating in the first direction D1 due to combustion events.

The EICP 22 and the EECP 28 can phase the respective intake and exhaust camshafts 29A, 29B to any selected crank angle A1 timing within a design range of authority incorporated within the EICP 22 and the EECP 28. That is, the EICP 22 and the EECP 28 are designed to provide a specific timing adjustment range. In an example embodiment, the EICP 22 and the EECP 28 have a range of authority of 120 degrees of crank angle A1; however, any suitable range of authority can be designed into the EICP 22 and EECP 28 (greater than 120 degrees or less than 120 degrees). FIG. 5 also includes plots of piston position indicators 76 that can identify phasing magnitude limits to avoid a collision between the intake/exhaust valves 40, 42 and the piston 25, defining a maximum range of authority.

The second intake valve lift event 70B and the second exhaust valve lift event 80B of FIG. 5 have a span between a peak intake valve lift and a peak exhaust valve lift that is approximately 450 crank angle degrees. Spans that are less than or greater than 450 crank angle degrees The ISG 90 can be utilized within the powertrain 100A to perform its normal functions as known in the field of hybrid-electric vehicles. In addition, the ISG 90 can be utilized to rotate the IC engine 20A in the second direction D2, which, in turn, rotates the transmission 36 in the second direction D2 to move the vehicle 10 in the reverse direction RD. In order to reduce the power requirement of the ISG 90 to motor the IC engine 20A and transmission 36 together in combination, a rotational resistance of the IC engine 20A can be reduced via a venting of the combustion chamber 21.

Regardless of rotational direction, as known in the field of IC engines, the piston 25 of the IC engine 20 moves up and down between BDC and TDC positions within the engine cylinder 30 like that of a compressor. In either rotation direction, if the piston 25 moves upward with the intake and exhaust valves 40, 42 closed, a volume of air is compressed. A resultant force of the compressed air acts on the piston top as it ascends within the engine cylinder from BDC to TDC. Thus, a force of compression resists the upward motion of the piston and work is required to overcome this compressive force. In order to reduce the work required by the ISG 90 to motor the IC engine 20A in the second direction D2, the combustion chamber 21 can be decompressed or vented via utilization of the second exhaust valve timing ET2 of FIG. 5 so that the exhaust valve lift event corresponds with an ascension of the piston 25 within the engine cylinder 30 from BDC to TDC. If the first exhaust valve timing ET1 of FIG. 5 is utilized, a majority of an upward stroke of the piston from 180 to 0 degrees would be compressing air since the exhaust valve 42 closes at approximately 130 degrees of crank angle and the intake valve 40 remains closed throughout this rotation. The direction of phasing the exhaust valve lift event, which is leftward within FIG. 5, could be described as being advanced relative to a fired engine rotation (first direction D1) or as being retarded in a motored engine reverse direction of rotation (second direction D2).

In addition to the work required to overcome the compression of air within the combustion chamber 21 of the engine cylinder 30, work is also required to move the piston 25 from a TDC position to a BDC position within the engine cylinder 30 when the IC engine 20A is being motored in a reverse rotation and the intake and exhaust valves 40, 42 are closed and a vacuum force is created within the engine cylinder 30 that resists rotation of the crankshaft 24. A closed state of the intake and exhaust valves 40, 42 is present according to FIG. 5 when the first intake valve timing IT1 is utilized during reverse rotation from 720 to approximately 600 degrees of crank angle. Therefore, the IECP 22 for the intake valve 40 (or multiple intake valves) can be included within the IC engine 20A that phases an intake valve lift event, for example, to the second intake valve timing IT2 of FIG. 5. With this phasing ability of the intake valve(s) 40, the intake valve lift event is aligned with the piston's descension from TDC to BDC (720 to 540 degrees of crankshaft angle) within the engine cylinder 30, thus reducing the work required by the ISG 90 to spin the crankshaft 24 in the second direction D2. Additionally, the second intake valve timing IT2 provides for an open intake valve during a portion of the ascension of the piston from BDC (540 degrees of crankshaft angle A1) to TDC (360 degrees of crankshaft angle A1). The direction of phasing of the intake valve lift event, which is rightward within FIG. 5, could be described as being retarded in a fired engine direction of rotation (first direction D1) or as being advanced in a motored engine reverse direction of rotation (second direction D2).

Various combinations of intake valve timing and exhaust valve timing could be utilized to reduce the rotational resistance of the IC engine 20A. As shown in FIG. 7, a camshaft position sensor 64 and a crankshaft position sensor 66 can be utilized to determine a position of the piston 25 within the engine cylinder 30. These sensors and the EICP 22 and EECP 28 can be electronically connected to an engine control unit (ECU) 50 or, alternatively, a phaser control unit. Therefore, a timing of the intake valve 40 and the exhaust valve 42 (or a valve lift event thereof) is electronically controlled. The phasing strategy of the intake and exhaust valves 40, 42 may depend on the position of the piston 25 right before the IC engine 20A, 20B, 20C is to be rotated in the second direction D2. Furthermore, the phasing strategy may include an initial valve timing for one or both of the intake and exhaust valves 40, 42 and then further valve timings for when the vehicle 10 is moving in the reverse direction RD or possibly once it has stopped after this reverse movement. In an example embodiment, a combination of the first intake valve timing IT1 and the second exhaust valve timing ET2 could be utilized in order to provide a continuous venting of the combustion chamber 21 throughout a duration or entirety of each upward stroke of the piston 25 within the engine cylinder 30 from BDC to TDC. In a further example embodiment, the second intake valve timing IT2 could be initially utilized if the piston 25 is at a position in which it is moving downward from a TDC position (or in a downward stroke) and it is necessary to provide a minimized rotational resistance to get the vehicle 10 moving from a standstill position.

Various hybrid-electric powertrains can also be employed within the vehicle 10 to carry out the previously described reverse strategy. The powertrain 100B of FIG. 2 utilizes a known BAS 92 implemented within an accessory drive of an IC engine 20B; this configuration is often referred to as a "P0" configuration. The BAS 92 can be mounted directly on the engine and driven by the crankshaft 24 via a belt 60 that connects a BAS pulley 62 to the crankshaft pulley 26. The BAS 92 could also be described as a second electric machine 32B configured to independently rotate the crankshaft 24. In addition to its known functions, the BAS 92 can rotate the IC engine 20B in the second direction D2 to move the vehicle 10 in the reverse direction RD. For clarity of the accessory drive represented within FIG. 2, the EICP 22 and EECP 28 were removed; however, at least one is present within the IC engine 20B to carry out the described reverse strategy.

The powertrain 100C of FIG. 3 utilizes a known TMG 94 implemented on or within a transmission 36C, which is also known as a "P2" configuration. The TMG 94 could also be described as a third electric machine 32C configured to independently rotate the crankshaft 24 of the IC engine 20C. In addition to its known functions, the TMG 94 can rotate the IC engine 20C in the second direction D2 to move the vehicle 10 in the reverse direction RD.

The previously described powertrains 100A, 100B, 100C can be utilized to move the vehicle 10 in the reverse direction RD without use of a reverse device or mechanism within the respective transmissions 36, 36C. Movement of the vehicle 10 in the reverse direction RD is accomplished by rotating the IC engines 20A, 20B, 20C and a corresponding input to the transmissions 36, 36C in the second direction D2. A method for moving the vehicle 10 in the reverse direction RD can include:

a). providing a vehicle with a powertrain that includes an IC engine and a transmission, the IC engine configured to rotate in a first direction as a result of combustion events that occur within a combustion chamber of the IC engine;

b). adjusting at least one of an intake valve timing or an exhaust valve timing of the IC engine via an electric camshaft phaser when the IC engine is either in: i) an engine shutdown mode, ii) a non-firing mode, or iii) a non-rotating state, so as to reduce a rotational resistance of the IC engine; and c). rotating the IC engine in a second rotational direction via an electric machine so that the vehicle moves in a reverse direction.

In an example embodiment, the IC engine 20A, 20B, 20C is rotated solely by the electric machine 32A, 32B, 32C in the second direction D2 without the aid of other components or motive means. In a further example embodiment, the electric machines 32A, 32B, 32C work together with a supplemental rotational means to rotate the IC engine 20A, 20B, 20C in the second direction D2.

To move the vehicle 10 in the reverse direction RD, the crankshaft 24 of the IC engine 20A, 20B, 20C is rotated multiple times by the electric machine 32A, 32B, 32C in the second direction D2. In an example embodiment, the crankshaft 24 of the IC engine 20A, 20B, 20C is rotated greater than one crankshaft revolution by the electric machine 32A, 332B, 32C. In a further example embodiment, the crankshaft 24 is rotated greater than two crankshaft revolutions by the electric machine. It should be stated, however, that there may be situations (for example, when a driver or operator changes his mind) which may result in a rotation of the crankshaft 24 in the second direction D2 that is less than one revolution.

The previously described strategy for rotation of the IC engine 20A, 20B, 20C in the second direction D2 can be utilized to move the piston 25 to a desired position within the cylinder 30 or a desired position within an engine combustion cycle. This could be accomplished for various reasons, including, but not limited to optimizing a firing engine start-up process of the IC engine via optimum positioning of the piston 25. Furthermore, the previously described strategy for rotation of the IC engine 20A, 20B, 20C in the second direction D2 can be utilized to move the crankshaft 24 to a desired crankshaft angle A1.

In an example embodiment, the previously described strategy for rotation of the IC engine 20A, 20B, 20C in the second direction D2 is not utilized for the purpose of achieving a desired or pre-determined ideal position of the piston 25 or crankshaft 24; stated otherwise, the previously described strategy is not utilized to adjust a position of the piston or crankshaft 24 (via reverse rotation of the crankshaft 24), but only for the purpose of moving a vehicle in a reverse direction. In an example embodiment, the piston 25 and crankshaft 24 are in a random position at a beginning and at an end of a duration of a motoring of the IC engine 20A, 20B, 20C in the second direction D2.

In an example embodiment, when the IC engine 20A, 20B, 20C is rotating at a given rate or rotational speed in the second direction D2 (via the electric machine), a corresponding output rate or output rotational speed of the transmission 36, 36C in the second direction D2 is less than the rotational speed of the IC engine. In a further example embodiment, when the IC engine 20A, 20B, 20C is rotating at a given rate or rotational speed in the second direction D2, a corresponding output rate or output rotational speed in the second direction D2 of the transmission 36, 36C is equal to that of the IC engine.

In an example embodiment, the adjustment of either the intake valve timing or the exhaust valve timing can occur after commencing a shutdown of the IC engine. The term "after commencing a shutdown of the IC engine" is meant to signify any time after the driver, operator, or ECU 50 has commanded the IC engine to be shut down. This can occur by turning a key to an "off" position or by actuating a kill switch. In a further aspect, "commencing a shutdown" can be a result of the driver or operator requesting a reverse motion while the IC engine is idling in a fired engine mode. Such a request could provide enablement of the ECU 50 to: commence shutdown of the IC engine, adjust the intake and/or exhaust valve in order to decrease rotational resistance, and command the electric machine 32A, 32B, 32C, to rotate the IC engine in the second direction D2.

In an example embodiment, the adjustment of either the intake valve timing or the exhaust valve timing can occur during a shutdown process of the IC engine 20A, 20B, 20C in order to prepare for reverse rotation of the IC engine 20A, 20B, 20C. The term "during a shutdown process" is meant to signify a time after a "key off" action has occurred (or kill switch activated), and a rotational speed of the IC engine is decreasing to a halted or non-rotating state.

In an example embodiment, adjustment of either the intake valve timing or the exhaust valve timing can occur when the IC engine is not rotating.

In an example embodiment, adjustment of either the intake valve timing or the exhaust valve timing can occur when the IC engine is in a non-firing mode, including, but not limited to, a shutdown process of the IC engine or when the IC engine rotation is stopped.

In an example embodiment, adjustment of either the intake valve timing or the exhaust valve timing can occur after rotation of the IC engine in the second direction has commenced.

The previously described camshaft phaser embodiments utilize electric camshaft phasers that can change a respective exhaust or intake valve lift event timing at any time while the engine is either in a firing mode or a non-firing mode such as when the IC engine is shutting down, is stopped, or is being rotated (motored) in the second direction D2. Such is a differentiating characteristic of electric camshaft phasers compared to hydraulic camshaft phasers that require pressurized hydraulic fluid (typically a product of an active engine-driven hydraulic fluid pump) to provide such phasing actions. Energization of one or more of the EICP 22 or EECP 28 during engine shutdown or engine stoppage can be accomplished via an energy storage device, such as a vehicle battery 12 shown in FIG. 1, and the ECU 50 (or separate phaser control unit) which can communicate electronically with each of phasers.

The previously described methodology for motoring the IC engines 20A, 20B, 20C in the second direction D2 (reverse rotation) may only require one of either the EICP 22 or the EECP 28. Furthermore, the EICP 22 and/or the EECP 28 configured for reducing a rotational resistance of the IC engines 20A, 20B, 20C during reverse rotation is/are also configured to phase the respective intake and exhaust valve lift events while the engine is firing within a standard four-stroke combustion cycle. Stated otherwise, these electric camshaft phasers can function as state-of-the-art electric camshaft phasers and are not limited to only phasing of the intake and exhaust valve lift events for reverse engine operation.

The powertrains 100A, 100B, 100C of FIGS. 1 through 3 represent three of many possible powertrain configurations that could incorporate the previously described example embodiments. Furthermore, these powertrains may incorporate additional clutches, as needed, or be modified in other suitable configurations that utilize electric machines.

The phased intake and exhaust valve lift events shown in FIG. 5 for reverse engine rotation depict non-overlapping intake and exhaust valve lift events that have a span between a peak intake valve lift and a peak exhaust valve lift that can range up to 450 crank angle degrees. Magnitudes that are more or less than 450 crank angle degrees are also plausible.

The powertrains 100A, 100B, 100C shown in FIGS. 1 through 3 can be utilized for a wide range of land or sea vehicles ranging from recreational vehicles, such as a snowmobile or an all-terrain vehicle (ATV), to on-highway passenger vehicles. Each of the powertrains 100A, 100B, 100C facilitate a reverse movement of the vehicle 10 without a reverse mechanism within the transmission, which offers a simplification of componentry and reduced packaging. Movement of the vehicle 10 in the reverse direction RD is accomplished by rotating the IC engines 20A, 20B, 20C and a corresponding input to the transmissions 36, 36C in the second direction D2.

It should be noted that any type of valve train can be utilized within the IC engines 20A, 20B, 20C including variable valve lift (VVL) valve trains and non-variable valve lift valve trains. The VVL valve trains can include continuously variable valve trains and discrete variable valve lift valve trains, both of which are known in the field of IC engines. In an example embodiment, a non-variable valve lift valve train, such as that shown within FIG. 4, is utilized to carry out the described valve timing strategies. Stated otherwise, a lift or opening magnitude of the intake and exhaust valves (or the peak lift provided by the cam nose) is held constant or fixed throughout operation of the IC engine. Such a non-VVL valve train is less expensive and less intrusive from a packaging perspective than VVL options.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A method of operating an internal combustion engine operating according to a four-stroke combustion cycle to move a vehicle in a reverse direction, the internal combustion engine having a combustion chamber defined by an intake valve, an exhaust valve, and a piston, the method comprising:

rotating the internal combustion engine in a first rotational direction via combustion events occurring within the combustion chamber via: i) a first intake valve timing of the intake valve relative to a firing engine combustion cycle, and ii) a first exhaust valve timing of the exhaust valve relative to the firing engine combustion cycle;

commencing shutdown of the internal combustion engine; adjusting at least one of:

an intake valve timing from the first intake valve timing to a second intake valve timing relative to the firing engine combustion cycle so as to decrease a rotational resistance of the internal combustion engine; or an exhaust valve timing from the first exhaust valve timing to a second exhaust valve timing relative to the firing engine combustion cycle so as to decrease a rotational resistance of the internal combustion engine; and rotating the internal combustion engine in a second rotational direction via an electric machine so that the vehicle moves in a reverse direction.

2. The method of claim 1, wherein the internal combustion engine does not include a valve train configured to vary a valve lift of the intake valve and a valve lift of the exhaust valve.

3. The method of claim 1, wherein the internal combustion engine comprises at least one camshaft configured to actuate at least one of the intake valve or the exhaust valve.

4. The method of claim 3, wherein:

the at least one camshaft comprises a cam lobe having a first flank, a cam nose, and a second flank arranged consecutively around a circumference of the cam lobe; and when the internal combustion engine is rotating in the first rotational direction via combustion events, the first flank opens one of the intake valve or the exhaust valve, and the second flank closes the one of the intake valve or the exhaust valve; and when the internal combustion engine is rotating in the second rotational direction via the electric machine, the second flank opens the one of the intake valve or the exhaust valve, and the first flank closes the one of the intake valve or the exhaust valve.

5. The method of claim 1, wherein the internal combustion engine further comprises an electric camshaft phaser configured for adjusting at least one of the intake valve timing or the exhaust valve timing.

6. The method of claim 1, wherein the second intake valve timing is retarded relative to: i) the first intake valve timing, and ii) the firing engine combustion cycle.

7. The method of claim 1, wherein the second exhaust valve timing is advanced relative to: i) the first exhaust valve timing, and ii) the firing engine combustion cycle.

8. A method for moving a vehicle in a reverse direction, the method comprising: providing a vehicle with a powertrain comprising:

an internal combustion engine operating according to a four-stroke combustion cycle having a piston configured to reciprocate within an engine cylinder so as to define a combustion cycle within a combustion chamber formed by the piston and the engine cylinder; and the internal combustion engine is configured to rotate in a first rotational direction via combustion events within the combustion chamber; and a transmission configured to be driven by the internal combustion engine and deliver at least one of an adjusted speed or an adjusted torque of the internal combustion engine to a propulsion interface element of the vehicle; and when the internal combustion engine rotates in the first rotational direction, the vehicle moves in a forward direction; and decompressing the internal combustion engine such that the combustion chamber is continuously vented throughout a duration of each upward stroke of the piston within the engine cylinder from a bottom dead center position to a top dead center position; and rotating the internal combustion engine in a second rotational direction via an electric machine so that the vehicle moves in a reverse direction.

9. The method of claim 8, wherein the combustion chamber is continuously vented via a valve configured to fluidly connect the combustion chamber to a passageway configured to flow air out of the combustion chamber.

10. The method of claim 9, wherein a timing of an opening of the valve relative to the combustion cycle is variable.

11. The method of claim 9, wherein an opening of the valve is electronically controlled.

12. The method of claim 8, wherein the transmission is not configured to move the vehicle in the reverse direction when the internal combustion engine is rotating in the first rotational direction.

13. The method of claim 8, wherein the engine cylinder further comprises an intake valve and an exhaust valve configured to respectively allow air into the engine cylinder and discharge combustion gases out of the engine cylinder.

14. The method of claim 13, wherein the intake valve and the exhaust valve are configured to continuously vent the combustion chamber throughout the duration of each upward stroke of the piston within the engine cylinder.

15. A method for moving a vehicle in a reverse direction, the method comprising:

providing a vehicle with a powertrain comprising:

an internal combustion engine operating according to a four-stroke combustion cycle defined by a reciprocating piston within an engine cylinder, and an intake valve and an exhaust valve configured to respectively control a flow of gases in and out a combustion chamber formed by the reciprocating piston and the engine cylinder; and the internal combustion engine is configured to rotate in a first rotational direction via combustion events within the combustion chamber; and a transmission configured to be driven by the internal combustion engine and deliver at least one of an adjusted speed or an adjusted torque of the internal combustion engine to a propulsion interface element of the vehicle; and adjusting at least one of an intake valve timing or an exhaust valve timing via an electric camshaft phaser when the internal combustion engine is in a non-firing mode so as to reduce a rotational resistance of the internal combustion engine; and rotating the internal combustion engine in a second rotational direction via an electric machine so that the vehicle moves in a reverse direction.

16. The method according to claim 15, wherein the electric machine is a belt-alternator-starter arranged within an accessory drive of the internal combustion engine.

17. The method according to claim 15, wherein the electric machine is an integrated starter generator arranged on a crankshaft of the internal combustion engine.

18. The method according to claim 15, wherein the electric machine is a transmission motor generator arranged on or within the transmission.

19. The method according to claim 15, wherein the intake valve and the exhaust valve are actuated via a cam lobe and the intake valve lift and the exhaust valve lift are not variable.

* * * * *